March 2, 1948.   F. K. DANIEL   2,437,080
FRACTIONATION OF LACTEAL LIQUIDS
Filed March 10, 1944
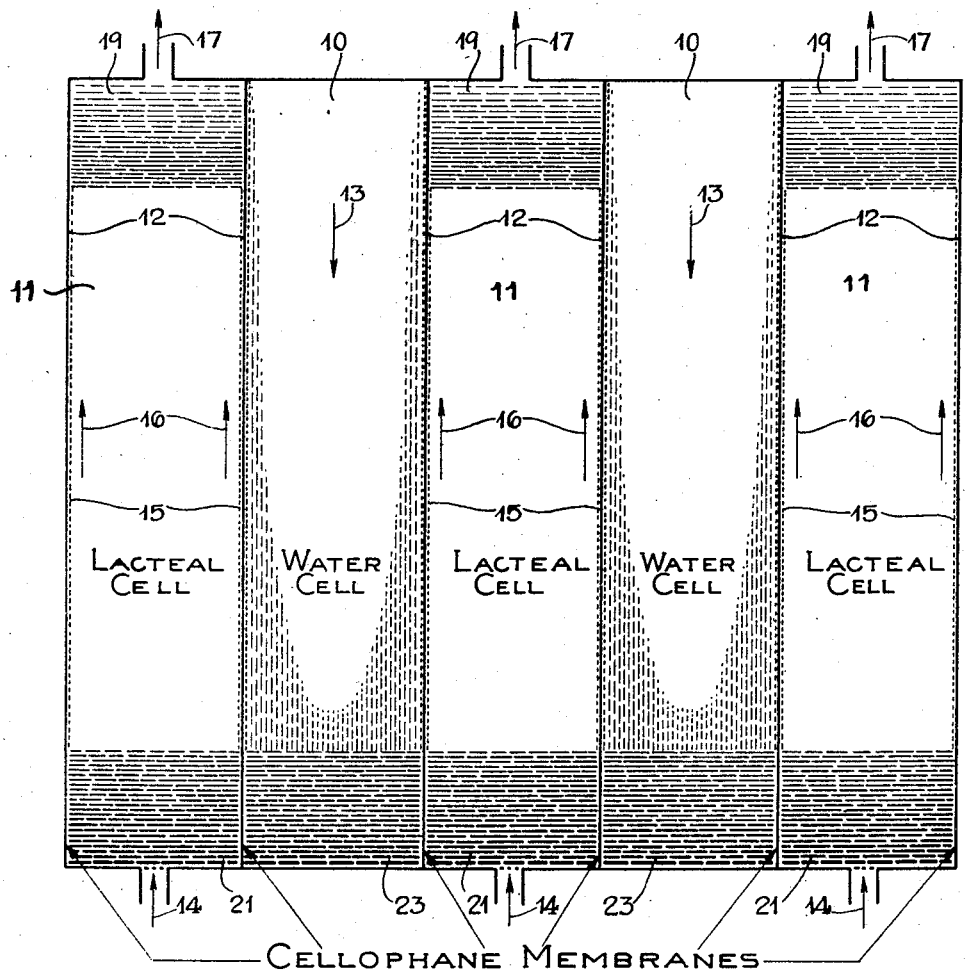
INVENTOR.
FREDERICK K. DANIEL.
BY Wilbur F. Keegan
ATTORNEY.

Patented Mar. 2, 1948

2,437,080

UNITED STATES PATENT OFFICE 2,437,080

FRACTIONATION OF LACTEAL LIQUIDS

Frederick K. Daniel, Kew Gardens, N. Y., assignor, by mesne assignments, to Sun Chemical Corporation, New York, N. Y., a corporation of Delaware Application March 10, 1944, Serial No. 525,943

5 Claims. (Cl. 99—57)

The present invention relates to the art of separating liquids that bear both colloids and non-colloids substantially in the absence of fats or oils, into fractions, respectively rich in colloids and rich in non-colloids, and it has particular application to the treatment of milk products, and more especially of skim milk or of whey.

Where any ingredient of skim milk, as for instance, the casein is recovered or isolated therefrom by chemical or enzymatic action, the recovery of other ingredients, such as lactose, vitamin B-1, vitamin B-2, lactalbumen and globulin, from the residue is ordinarily a complex and costly procedure.

Moreover, where the colloid or protein is recovered from skim milk by acid treatment, by heat treatment, or by the use of enzymes, substantial increase in the particle size of the protein and substantially complete loss of the protective colloid effect thereof, appears to be inevitable as a result of the coagulation, precipitation or aggregation that occurs in such operation. Such coagulation or aggregation entails sufficient increase in diameter of the solid particles for sedimentation out of the liquid according to Stokes' law, and for many uses, the proteins are much less useful than were they in finely divided colloid form.

It is among the objects of the invention to separate the proteins such as casein, lactalbumen or blood albumen from the non-proteins, specifically from crystalloid matter in a liquid, without the use of added chemicals, and without changing the state of sub-division of the proteins, as by coagulation, precipitation or aggregation thereof.

Another object is the utilization of such fractionation technique with economy and uniformity, with a minimum evolution of heat or of bacterial growth, and with the absence of secondary reactions, for separating skim milk into fractions having high utility as such, or from which valuable ingredients may readily be extracted, such as colloidal casein, undenatured lactalbumen, globulin, lactose, vitamin B-1 and vitamin B-2.

Another object is to produce a liquid, concentrated milk which contains in unchanged form all the ingredients present in milk and which is entirely free of the cooked flavor of condensed milk.

Another object is to recover economically from skim milk or from whey a clear solution of the water-soluble vitamins present therein, together with lactose and mineral salts, a solution suitable for various purposes, as for instance, as a culture medium for yeast, penicillin and other molds, and for bacteria.

Another object is the economical preparation of a protein milk of low lactose content, suitable for those suffering from pancreatin deficiency or from diabetes.

The present application is a continuation in part of my copending applications, Serial No. 429,104, filed January 31, 1942, which application is now abandoned, and Serial No. 472,282, filed January 13, 1943.

The invention involves the treatment of a liquid such for instance as a lacteal fluid by gravity stratification that is by causing the part of the liquid which is of lower specific gravity to flow upwardly and be displaced by the part of the liquid of high specific gravity. The stratification is entirely due to the flow induced by the difference in specific gravity of different portions of skim milk or whey in the dialysis cell. The change in specific gravity is caused, for example, by removing osmotic diffusion of lactose and free mineral salts from, and passage of water into, portions of the skim milk adjacent a membrane in a dialysis cell.

This is quite different from permitting solid particles to pass downwardly or upwardly through a liquid because of gravity which is sedimentation of particles from out of the liquid. In contradistinction to the action of a centrifuge, for instance, where the particles are bodily moved through and relative to the liquid for separation therefrom, gravity action according to the present invention, is applied to liquid layers which entrain the solid particles therewith, without up or down movement thereof relative to the carrying liquid.

According to the invention, the separation is effected by blocking the movement of the larger colloid or protein particles, while permitting the smaller or crystalloid matter to pass through diaphragms or semi-permeable membranes of Cellophane for instance.

For dialysis, the liquid to be fractionated is introduced into alternate or liquor cells defined by semi-permeable membranes, the intervening or water cells being filled with water. In dialysis, the smaller and more mobile molecules pass under osmotic difference of potential from the liquor cells to the water cells, while water passes in reverse direction into the liquor cells, diluting the contents thereof (endosmosis). The diluted, partly dialyzed vertical zone of liquor directly adjoining the membranes will rise to the top of the dialyzer more quickly than the less diluted fluid more distant therefrom. The liquor in the dilute zones dialyzes further as it moves upward along the membranes, finally resulting in a horizontal stratum or top layer which is relatively free of non-colloidal material, and rich in colloids, while the undialyzed part of greater density remains in the lower parts of the cells. The dialyzed top layer may be readily withdrawn.

In the drawing, there is diagrammatically illustrated the process of gravity stratification, the water cells being indicated at 10 and the cells containing skim milk or whey being indicated at 11. The diaphragms 12 may be of Cellophane or regenerated cellulose. The direction of flow in the water cells is downward as indicated by the arrows 13. The skim milk or whey is introduced at 14 in such a manner as to remove the possibility of turbulent flow in the cells 11. However, currents of circulating lacteal liquid are set up within cells 11 by reason of decrease in specific gravity of thin layers 15 of skim milk or whey immediately adjacent to the diaphragm 12. The film 15 of decreasing specific gravity will flow upwardly as indicated by arrows 16 and will collect in a horizontal layer 19 at the top of cells 11. The skim milk or whey of reduced specific gravity then may be removed as indicated at 17 at the top of the cells 11.

The incoming lacteal fluid passing into the cells 11 at 14 will form the layer 21 of maximum specific gravity at the bottom, while the dialyzed liquid 19 after passing along the membranes 12 is stratified as in horizontal lines 19 at the top of the cells 11. In the water cells 10 the diffused material will descend downwardly along the length of the membranes 12 to form the diffusate lines 23 of maximum specific gravity. The diffusate is then removed.

Where the fractions or some of them are to be used as food products, the temperature of the liquor and of the water must be kept low to avoid bacterial action. Where the fraction is intended for industrial rather than for dietetic application, it may be prepared at elevated temperatures to promote the speed of operation and suitable preservatives may be added to neutralize bacterial action that would otherwise occur at a higher temperature.

Among the objects of the invention are to produce a variety of new products from skim milk, whey and other substantially fat or oil free lacteal fluids, among which skim milk products are a colloidal protein, a protective colloid, an ingredient for an ice cream mix, a protein milk low in lactose and ash, an emulsifying agent, a casein emulsion, a water soluble lactalbumen and a vitamin and lactose bearing diffusate free of protein.

By the procedure of the present invention, the non-protein constituents of skim milk may be removed or substantially reduced without changing the state of aggregation of the proteinaceous or casein particles from the condition prevailing in the whole milk, changes which are inevitable where the separation is effected by chemical means, according to known procedures.

The casein particles in whole or skim milk while considerably heavier than the milk serum are individually so small that they do not admit of being centrifuged on a commercial scale. By the present invention, the casein particles are caused readily to be separated in a liquid fraction from the serum without sedimentation thereof, or increase of the size of the individual particles present in the skim milk.

The absence or substantial reduction in the non-protein constituents of the proteinaceous fraction appears to bring about a change in the behavior of the protein ingredients, rendering that fraction peculiarly valuable, as for instance, in the ice cream art, as will appear hereinafter.

While dialysis may be performed on a commercial scale upon any skim milk, it is preferable to use skim milk that has first been concentrated, preferably by vacuum concentration, to as dense a consistency as feasible, bearing in mind the requirement that it be not too viscous for stratification. Superheated skim milk of a solid content greater than 15 to 20 per cent is too viscous, but vacuum concentrated skim milk of as high a solid content as 30 to 34 per cent may be used. For that reason, vacuum concentrated skim milk is to be preferred, and also because the mode of preparation thereof avoids the denaturing of the albumen fraction and the burnt flavor sometimes found in products made from the superheated skim milk.

For practical purposes, it is not feasible by dialysis of skim milk, to effect a reduction of more than 50 per cent in the lactose contained in the proteinaceous layer. By the time such reduction has been achieved in the lactose, the free mineral salt content will have been reduced to the extent of about 80 per cent. The protein fraction will have 13 to 14 per cent solids and the non-protein portion about 7 per cent. The dialyzed product is preferred as an ingredient of the ice cream mix or for other dietetic purposes, for reasons pointed out hereinafter.

Where the product is used as an article of diet, it is especially important that the dialysis be conducted at relatively low temperature. Preferably the milk and water both should be at a temperature of about 40 degrees F. during dialysis, though for continuous operation a temperature as high as 50 degrees or even 60 degrees F. has been used without harmful effect. The use of higher temperatures while promoting the rate of dialysis, also promotes bacterial growth to such extent as to necessitate frequent cleaning of the dialyzer. Bearing in mind that on each resumption of operation, some hours elapse before the condition of equilibrium is attained that is a prerequisite to efficient dialysis, the advantage of the lower temperature is manifest, since it permits four or five days of continuous operation without interruption for cleaning. At the end of four or five days of operation, the dialyzer must be cleaned and prepared again for operation. This will mean an interruption of the process of from eight to twelve hours duration. The cleaning can be done by one man or preferably by one man and a helper. They could keep a plant, consisting of four or five units going all the time, cleaning the separators on a stagger system. One unit having 120,000 square inch dialyzing surface will process 600 pounds of milk solids a day, converting it into 170 pounds of the non-protein solids and 430 pounds of the protein solids. The two liquid fractions can be obtained at a cost of only about five cents a gallon above the cost of preparing 30 per cent concentrated skim milk.

Most of this expense is not for operating cost but for the depreciation and interest, assuming the writing off of the equipment over a period of six or seven years which is extremely conservative in view of the fact that it has no movable parts.

In the dialysis, it is important that the skim milk flow upward and the water downward through the cells and that both liquids leave the dialyzer after flowing through one cell only. Otherwise the gravity separation of the liquid layers cannot take place properly and according to the present invention, dialysis based on the principle of osmosis alone without simultaneous gravity separation and stratification is not effective. The dialysis may be performed in a continuous action through a plurality of alternate liquor and water cells in substantially the apparatus disclosed in my copending application Serial No. 336,332, filed May 21, 1940, which has now matured under Patent No. 2,365,457, dated December 19, 1944.

As above noted, in the dialysis, substantial quantities of water enter the milk cells from the water cells and effect substantial dilution of the milk to as much as double the original volume. The more concentrated the milk, the greater the concentration of the diffusate and the greater the dialyzing efficiency but also the greater the dilution of the proteinaceous fraction.

In one specific example, a superheated skim milk of a solid content of 20 per cent is dialyzed as above described. The resulting dialyzate in a typical case has 4.9 per cent protein, 3.1 per cent lactose and 0.6 per cent ash and has been diluted with water in the course of dialysis, to such extent that its volume is 140 per cent of the original. The dialyzate has a conductivity of 1500 micromhos at 20 degrees C. where the conductivity of the original concentrated skim milk was 6300 micromhos. Water is now added to increase the volume to double that of the original skim milk.

*Uses of proteinaceous fraction of skim milk and whey*

The proteinaceous fraction of skim milk, according to the present invention, yields a variety of new and useful products including improved dietetic substances among which are a milk product containing all the milk proteins in undenatured, unaltered form but low in lactose, ash and vitamins, an improved ingredient for an ice cream mix, an improved ice cream stabilizer, and a modified lacteal product of improved whipping properties, also an improved emulsifying agent, an improved protective colloidal casein emulsion and a relatively pure undenatured lactalbumen and lactglobulin low in lactose, ash and vitamins. The lactalbumen, lactglobulin, ash and vitamins, above recited, may be derived by dialysis of whey, preferably concentrated whey derived from skim milk. These products are especially valuable in the pharmaceutical field. Some of these products will now be described.

*Ice cream*

Two per cent of milk solids derived from skim milk dialyzed to 20 to 25 per cent of its original conductivity, and to about one-half its original lactose content is added to a regular ice cream mix containing 12 per cent fat, 9.6 per cent regular milk-solids-non-fat (MSNF), 16 per cent sugars and .5 per cent stabilizer. The resulting ice cream shows a greatly improved texture and body and no traces of sandiness even upon prolonged storage. Since the lactose content of the dialyzed milk was about 43 per cent of the total solids, approximately .86 per cent of lactose had been added to the regular ice cream mix. Yet, though the advantage of increased body was attained by the addition of the dialyzed milk, coarsening of texture and sandiness which would have been inevitable had the same quantity of lactose been introduced into the ice cream mix by the addition of untreated skim milk is avoided, and the ice cream is fine textured and smooth.

Upon dialyzing a concentrated skim milk having 30 per cent solid content to a conductivity of 1200 micromhos, the proteinaceous fraction was found to contain 6.64 per cent proteins, 5.77 per cent lactose and .92 per cent ash. Where 3.6 per cent solids of that fraction was used in addition to 1.8 per cent of normal MSNF in place of the 9 per cent of superheated skim milk solids in standard ice cream mix, the results were comparable therewith. Though a reduction of 40 per cent was thus effected in total milk-solids-non-fat, the batch froze satisfactorily and had the same overrun as that from the standard ice cream mix. The batch with the dialyzed skim milk fraction developed slightly less body and slightly coarser texture after having been held in the freezing cabinet for one day than did the standard ice cream, but on the third day it became indistinguishable from the standard batch with respect to texture, and after a week it was somewhat superior to the ice cream from the standard batch. Thus the ageing qualities of ice cream made from mix containing the proteinaceous dialyzed milk fraction are superior to that made from the standard ice cream mix.

Advantages flowing from the use of the proteinaceous dialyzed milk fraction of the present invention will also be apparent from the following comparison made between three 200-gallon batches of ice cream mix identical in composition except for the milk solids.

| Batch No. | 1 | 2 | 3 |
|---|---|---|---|
| | Lbs. | Lbs. | Lbs. |
| Regular milk solids non-fat | 155 | 82.2 | 61.6 |
| Superheated condensed milk dialyzed from 5600 to 1000 micromhos conductivity | | | 20.6 |
| Total milk solids | 155 | 82.2 | 82.2 |

Batch No. 1 is regular ice cream composition of smooth texture and satisfactory body.

In Batch No. 2 the mix had little more than half the milk-solids-non-fat content of the regular ice cream mix, for which reason it yielded an unsaleable product containing mostly ice crystal and with little overrun.

Batch No. 3 contained no greater proportion of MSNF than did Batch No. 2, but 25 per cent of that MSNF content being the proteinaceous dialyzed skim milk fraction of the present invention gave as smooth an ice cream as the standard of Batch No. 1, with overrun and freezing characteristics identical with those of the standard ice cream despite the fact that it has much less MSNF content.

Why the reduced lactose and ash content of a small proportion of the proteinaceous skim milk fraction in an ice cream mix should lead to the great advantages set forth is difficult to explain. Tentatively, the theory may be advanced that the absence of a substantial proportion of electrolyte from the fraction changes the swelling equilibrium characteristic of the protein, so that the protein imparts bodying characteristics to the ice cream, equivalent to those attained with the much larger proportion of lactose used in standard ice cream mix.

Whip

The proteinaceous skim milk fraction of the character above set forth with the proportion of protein to lactose increased from approximately 3 to 4 of ordinary skim milk to 4 or more to 3, admits of being whipped to a stiff whip with an overrun which is higher and the stability of which is considerably greater than that of concentrated skim milk. When the whip breaks down and liquefies upon prolonged standing, it, moreover, admits of being re-whipped as before.

Stabilizer for ice cream mix

Proteinaceous skim milk fraction resulting from dialysis by the process of the present invention and having a solid content of up to 15 per cent and a conductivity of one-fourth its original value, that is, of 1400 micromhos or less, with an accompanying volume increase of 25 per cent or more, serves to replace part or all of the conventional ice cream stabilizers. When added in proportions of two per cent to an ice cream mix, the resultant ice cream is quite as stable and smooth as the same mix when prepared with gelatine or with alginate stabilizers.

Other dietetic uses

The proteinaceous fraction of skim milk prepared according to the present process moreover constitutes a superior high protein emulsion for various dietetic purposes.

By the addition of cream, mineral salts and vitamins to the proteinaceous fraction, the original balance of whole milk may be recreated except that it contains less lactose. This product may be fed to diabetics or to children suffering from "ciliac" or other pathological conditions. Ciliac is a children's disease caused by insufficient functioning of pancreatic glands and those afflicted are unable to digest normal carbohydrates. The proteinaceous fraction may also be reconstituted with decreased amounts of butter fat to serve a given diet. In other cases, saccharin may replace the missing lactose to make a more palatable product and in still other instances sucrose or other sweetening agents may be added to make up for the lack of sweetness and lack of carbohydrates.

The proteinaceous fraction obtained from the dialysis of milk is distinguished from other low lactose milk products in that it contains no foreign matter such as gums, or added mineral salts and in that all the proteins are present in unchanged form and proportion. The proteinaceous fraction of skim milk is further distinguished from conventional types of milk in that coagulation of the casein therein occurs at a higher pH value. Unlike conventional curd, the curd obtained from dialyzed milk shows a great reduction in the whey solids. This protein fraction is also of high utility as a raw material for making certain types of cheese.

The proteinaceous fraction obtained from dialyzing whey or concentrated whey is low in lactose and even lower in salts and thereby becomes more palatable. The undenatured lactalbumen fraction has a great value as a soluble food product which may be added to various drinks or to milk as a rich source of the necessary amino acid required by the body.

Industrial applications

Particular advantages are attained in the industrial field by virtue of the fine state of subdivision of the protein in a liquid body of relatively low viscosity, which admits of rapid conversion into a gel by the addition of alkalis or of chemical hardening agents.

Non-protein fraction of skim milk and whey

The non-protein fraction obtained by dialysis differs from that obtained by electro-decantation of skim milk or whey and it also differs radically from the normal whey remaining after removal from milk of protein coagulated with acid or rennet. The non-protein fraction or diffusate resulting from the dialysis treatment unlike that obtained by electrodecantation is a clear solution entirely free of colloidal matter.

Depending upon the ratio of flow of the water and the concentration and rate of flow of the lacteal fluid, the concentration of the diffusate or low molecular fraction separated by the dialysis treatment may range between relatively wide limits. In a typical case of dialyzing concentrated skim milk, and feeding the water and the milk at about equal rate, the diffusate may have 6 to 8 per cent solid content of which 85 per cent is lactose, 12 to 14 per cent ash or mineral salts, the balance being amino acids and vitamins and it has a slightly salty taste and a pH of about 6.6. The ash constitutes the mineral salts in true solution and of course does not include the calcium or phosphorus that is bound to the casein molecule and which stays in the proteinaceous fraction. The vitamins in the diffusate are vitamin $B_1$ and vitamin B–2 which imparts to the crystal clear solution a greenish yellow fluorescence. Depending on the concentration of the skim milk and the rate of flow of water and milk through the dialyzer, the solid content may be higher or lower than in this particular example. The diffusate has high utility as a culture medium for bacteria, yeasts and for molds, especially for producing penicillin.

When heating this fraction to 85 degrees C. or higher, a calcium phosphate precipitate is formed, which may be filtered or decanted off. If the pH of the solution is lowered to 6.0 or less by addition of acids, such as citric or lactic acid, or by allowing the solution to acidify by formation of lactic acid from lactose upon standing, no precipitate forms when the solution is heated.

The liquid diffusate may be converted into a powder by vacuum concentration and spray drying or by other conventional drying procedure. The powder may readily be dissolved in water or other aqueous solution and is distinguished from ordinary dried whey powder in that it has no lactalbumen and has an entirely different ratio of lactose to mineral salts, and in that it is completely water soluble, free from all proteins and fat and is not subject to protein breakdown on standing.

If desired, the bulk of the lactose may be crystallized out of the diffusate by merely concentrating the solution and allowing time for crystallization. Such crystallization occurs readily since there is an absence of the proteins, the presence of which renders difficult the production of lactose from whey, and the lactose obtained is relatively pure.

The residual mother liquor may serve as a source of vitamins. By a process of adsorption or exchange on a column of ion exchange resin, the vitamin B-1 may be removed and later be eluted from the exchange resins by means of acids. The effluent may be passed through a similar column containing alumina for selectively adsorbing vitamin B-2. The residual mother liquor remaining after such crystallization and which contains mineral salts and vitamins with some lactose or the protein free fraction with its unreduced lactose content may be spray dried and utilized as a reinforcement in poultry food or for dietetic purposes.

The diffusate obtained from dialyzing whey or concentrated whey is closely similar to the above described diffusate prepared from skim milk. Substantially the only difference is that the pH of the acid whey is lower. The whey diffusate may be processed in the manner set forth above.

While the invention has an important application to skim milk and in some of its aspects to whey, substantially fat free protein and colloidal dispersions generally other than animal lacteal fluids may be treated by the processes of the present invention. Among these substances are blood plasma, enzymes, bacteriological sera, as well as seed and cereal extracts.

As many changes could be made in the above product and process, and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A continuous osmotic diffusion and gravity stratification dialysis procedure comprising placing a lacteal fluid selected from the class consisting of cows' milk and cows' whey between vertical permeable membranes and placing water on the other sides of said membranes, permitting the free mineral salts and diffusable materials in the vertical layer of said lacteal fluid immediately adjacent the membrane to pass through the membrane into the water and water through the membrane into said vertical layer, whereby the specific gravity of said vertical layer will be reduced and then permitting said layer of reduced specific gravity to flow upwardly along the membrane and stratify at the top of the fluid, removing the reduced specific gravity upper strata from the top and introducing additional lacteal fluid at the bottom while maintaining the internal circulation due to change of specific gravity resulting from osmotic diffusion and without turbulence, the circulation within said fluid being solely due to gravity stratification.

2. A continuous osmotic diffusion and gravity stratification dialysis procedure comprising passing vacuum concentrated cows' skim milk only once upwardly between vertical permeable membranes while passing downwardly water on the other sides of said membranes, permitting the free mineral salts and diffusable materials in the vertical layer of said skim milk immediately adjacent the membrane to pass through the membrane into the water and water through the membrane into said vertical layer, whereby the specific gravity of said vertical layer will be reduced and then permitting said layer of reduced specific gravity to flow upwardly along the membrane and stratify at the top of the body of skim milk between said membranes, removing the reduced specific gravity upper strata from the top and introducing additional vacuum concentrated skim milk at the bottom of the body of skim milk between said membranes while maintaining the internal circulation due to change of specific gravity resulting from osmotic diffusion and without turbulence, the circulation within said body being solely due to gravity stratification.

3. A continuous osmotic diffusion and gravity stratification dialysis procedure comprising placing a body of vacuum concentrated cows' skim milk of 30 to 34% solids content between vertical permeable membranes and placing water on the other sides of said membranes while maintaining at temperature of about 40° F. to 60° F., permitting the free mineral salts and diffusable materials in the vertical layer of said skim milk immediately adjacent the membrane to pass through the membrane into the water and water through the membrane into said vertical layer, whereby the specific gravity of said vertical layer will be reduced and then permitting said layer of reduced specific gravity to flow upwardly along the membrane and stratify at the top of the skim milk body removing the reduced specific gravity upper strata having a conductivity of not more than about 20% to 25% of the initial skim milk and having a free mineral salt content reduced by about 80% from the top and introducing additional skim milk at the bottom while maintaining the internal circulation due to change of specific gravity resulting from osmotic diffusion and without turbulence, the circulation within said body being solely due to gravity stratification.

4. A continuous osmotic diffusion and gravity stratification dialysis procedure comprising placing a body of vacuum concentrated cows' whey between vertical permeable membranes and placing water on the other sides of said membranes, permitting the free mineral salts and diffusable materials in the vertical layer of said whey body immediately adjacent the membrane to pass through the membrane into the water and water through the membrane into said vertical layer, whereby the specific gravity of said vertical layer will be reduced and then permitting said layer of reduced specific gravity to flow upwardly along the membrane and stratify at the top of the body, removing the reduced specific gravity upper strata from the top and introducing additional whey at the bottom while maintaining the internal circulation due to change of specific gravity resulting from osmotic diffusion and without turbulence, the circulation within said fluid being solely due to gravity stratification.

5. A continuous osmotic diffusion and gravity stratification dialysis procedure comprising placing vacuum concentrated cows' whey between vertical permeable membranes and placing water on the other sides of said membranes, permitting the free mineral salts and diffusable materials in the vertical layer of said lacteal fluid immediately adjacent the membrane to pass through the membrane into the water and water through the membrane into said vertical layer having maintained a temperature of 40° F. to 60° F., whereby the specific gravity of said vertical layer will be reduced and then permitting said layer of reduced specific gravity to flow upwardly along the membrane and stratify at the top of the fluid, removing the reduced specific gravity upper strata from the top to obtain a whey product and introducing additional whey at the bottom while maintaining the internal circulation due to change of specific gravity resulting from osmotic diffusion and without turbulence, the circulation within said fluid being solely due to gravity stratification.

FREDERICK K. DANIEL.

REFERENCES CITED

The following references are of record in the file of this patent:

UNITED STATES PATENTS

| Number | Name | Date |
|---|---|---|
| 956,246 | White et al. | Apr. 26, 1910 |
| 1,022,523 | Whitney | Apr. 9, 1912 |
| 1,511,808 | Grindrod | Oct. 14, 1924 |
| 1,714,597 | Grindrod | May 28, 1929 |
| 2,247,065 | Pauli et al. | June 24, 1941 |
| 2,375,957 | Stamberger | May 15, 1945 |

FOREIGN PATENTS

| Number | Country | Date |
|---|---|---|
| 505,752 | Great Britain | May 15, 1939 |
| 505,753 | Great Britain | May 15, 1939 |

OTHER REFERENCES

Sutermeister et al., "Casein and its Industrial Applications," 2nd edition, published 1939 by Reinhold Publ. Corp., pp. 13, 14, 15, 21, 26, 89 and 96. (Copy in Div. 15.)